United States Patent
Liu

(10) Patent No.: US 10,616,881 B2
(45) Date of Patent: Apr. 7, 2020

(54) OFDMA TRANSMISSION METHOD, ACCESS POINT AP, AND STATION

(71) Applicant: Huawei Technologies Co., Ltd., Shenzhen, Guangdong (CN)

(72) Inventor: Sheng Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 174 days.

(21) Appl. No.: 15/699,959

(22) Filed: Sep. 8, 2017

(65) Prior Publication Data

US 2017/0374655 A1    Dec. 28, 2017

Related U.S. Application Data

(63) Continuation of application No. PCT/CN2015/074005, filed on Mar. 11, 2015.

(51) Int. Cl.
*H04W 72/04* (2009.01)
*H04W 28/16* (2009.01)
(Continued)

(52) U.S. Cl.
CPC ......... *H04W 72/044* (2013.01); *H04L 5/0007* (2013.01); *H04L 5/0048* (2013.01);
(Continued)

(58) Field of Classification Search
CPC . H04W 72/044; H04W 28/16; H04W 72/042; H04W 72/121; H04W 84/12;
(Continued)

(56) References Cited

U.S. PATENT DOCUMENTS 8,693,406 B2    4/2014  Ahmadi et al.
2007/0254607 A1  11/2007  Bandemer et al.
(Continued)

FOREIGN PATENT DOCUMENTS

CN    1909536 A    2/2007
CN   101467362 A   6/2009
(Continued)

OTHER PUBLICATIONS

Orfanos et al.;"A Centralized MAC Protocol With QOS Support for Wireless LANs"; The 18th Annual IEEE International Symposium on Personal, Indoor and Mobile Radio Communications; Athens, Greece; Sep. 3-7, 2007; 6 pages.
(Continued)

*Primary Examiner* — Obaidul Huq
(74) *Attorney, Agent, or Firm* — Kilpatrick Townsend & Stockton LLP

(57) ABSTRACT

Embodiments of the present disclosure provide an OFDMA transmission method, an access point (AP), and a station. The method includes: allocating, by an access point AP, a same resource unit (RU) to multiple stations, where the RU includes one or more subcarriers in a frequency domain; and sending, by the AP and on the same RU, downlink data to the multiple stations in a time division multiplexing manner or a code division multiplexing manner, and sending, by the AP and on the same RU, pilot symbols to the multiple stations. In this way, the AP may send, on the same RU, the downlink data and the pilot symbols to the multiple stations within a limited time, thereby improving resource utilization efficiency.

20 Claims, 6 Drawing Sheets

An access point AP allocates a same resource unit RU to multiple stations, where the RU is one or more subcarriers in a frequency domain — S201

The AP sends, on the same resource unit RU, downlink data to the multiple stations in a time division multiplexing manner or a code division multiplexing manner, and the AP sends, on the same resource unit RU, pilot symbols to the multiple stations — S202

(51) Int. Cl.
  *H04L 5/00* (2006.01)
  *H04W 72/12* (2009.01)
  *H04W 84/12* (2009.01)
  *H04B 7/0452* (2017.01)
  *H04B 7/0456* (2017.01)

(52) U.S. Cl.
  CPC ......... *H04W 28/16* (2013.01); *H04W 72/042* (2013.01); *H04W 72/121* (2013.01); *H04B 7/0452* (2013.01); *H04B 7/0456* (2013.01); *H04W 84/12* (2013.01)

(58) Field of Classification Search
  CPC ... H04L 5/0007; H04L 5/0048; H04B 7/0452; H04B 7/0456
  USPC .................................. 370/310, 328, 329, 330
  See application file for complete search history.

(56) References Cited

U.S. PATENT DOCUMENTS

| | | | |
|---|---|---|---|
| 2008/0253469 A1* | 10/2008 | Ma | H04B 7/0678 375/260 |
| 2009/0285173 A1* | 11/2009 | Koorapaty | H04L 5/0007 370/330 |
| 2012/0243503 A1* | 9/2012 | Mochida | H04W 28/04 370/330 |
| 2013/0128820 A1 | 5/2013 | Yuan et al. | |
| 2013/0163569 A1 | 6/2013 | Lee et al. | |
| 2013/0286966 A1 | 10/2013 | Chung et al. | |

FOREIGN PATENT DOCUMENTS

| | | |
|---|---|---|
| CN | 102484801 A | 5/2012 |
| CN | 103780529 A | 5/2014 |

OTHER PUBLICATIONS

Lanante et al.; "Considerations on UL MU resource scheduling"; IEEE 802.11-15/0377r0; Mar. 9, 2015; 16 pages.

* cited by examiner

OFDMA TRANSMISSION METHOD, ACCESS POINT AP, AND STATION

CROSS-REFERENCE TO RELATED APPLICATIONS

This application is a continuation of International Application No. PCT/CN2015/074005, filed on Mar. 11, 2015, the disclosure of which is hereby incorporated by reference in its entirety.

TECHNICAL FIELD

Embodiments of the present application relate to transmission technologies in the communications field, and in particular, to an OFDMA transmission method, an access point AP, and a station.

BACKGROUND

In an orthogonal frequency division multiple access (OFDMA) transmission manner used in the wireless local access network (WLAN for short) standard 802.11ax, a time length of an orthogonal frequency division multiplexing (OFDM) symbol that does not include a cyclic prefix (CP) is 12.8 µs. In a frequency domain, a smallest resource unit (RU) includes 26 subcarriers. Typically, 24 subcarriers are used to carry useful information and are referred to as data subcarriers, and two pilot subcarriers are used to correct a phase deviation caused by a frequency offset and phase noise. To reduce channel contention, an access point (AP) always tries to transmit as much data as possible in one transmission opportunity. For example, if duration of one transmission opportunity is 5.1 ms, 100 µs are used to transmit a preamble of a physical-layer packet, and CP duration is 0.8 µs, a data field part may include about (5.1 ms-100 µs)/(12.8 µs+0.8 µs)=368 OFDM symbols. It is assumed that a modulation and coding scheme (MCS) MCS 4 corresponding to a medium signal-to-noise ratio (SNR) is used, that is, 16 quadrature amplitude modulation (QAM) and convolutional coding whose code rate is 3/4 are used. One RU is used to transmit about 368×4×3/4×24/8=3312 bytes.

However, in actual application, there are a large quantity of applications of small data packet transmission, for example, interactive media, online gaming, user operation and control in office cloud application, instant messaging, web browsing, and the like. Generally, even if all data in one station is transmitted by using one RU, to meet a requirement for timely data transmission, the station cannot fully use, in a limited time period, the RU occupied by the station. Therefore, the RU needs to be padded with a useless bit, and low resource utilization is caused.

SUMMARY

Embodiments of the present disclosure provide an OFDMA transmission method, an access point, and a station, so as to improve resource utilization efficiency.

According to a first aspect, an embodiment of the present disclosure provides an OFDMA transmission method, including: allocating, by an access point AP, a same resource unit RU to multiple stations, where the RU is one or more subcarriers in a frequency domain; and sending, by the AP and on the same resource unit RU, downlink data to the multiple stations in a time division multiplexing manner or a code division multiplexing manner, and sending, by the AP and on the same resource unit RU, pilot symbols to the multiple stations.

With reference to the first aspect, in a first possible implementation manner of the first aspect, the sending, by the AP and on the same resource unit RU, downlink data to the multiple stations in a time division multiplexing manner specifically includes: dividing the resource unit RU into multiple subframes in a time domain, where each subframe is corresponding to at least two OFDM symbols in the time domain; and separately sending, by the AP, the downlink data of the multiple stations by using different orthogonal frequency division multiplexing OFDM symbols of each subframe on the same resource unit RU.

With reference to the first aspect, in a second possible implementation manner of the first aspect, the sending, by the AP and on the same resource unit RU, downlink data to the multiple stations in a code division multiplexing manner specifically includes: dividing the resource unit RU into multiple subframes in a time domain, where each subframe includes at least two OFDM symbols in the time domain, and data subcarriers at a same location in all OFDM symbols of each subframe are a data subcarrier group; and sending, by the AP, the downlink data of the multiple stations through different code channels in the data subcarrier group in the resource unit RU.

With reference to the first aspect, or the first or the second possible implementation manner of the first aspect, in a third possible implementation manner of the first aspect, the sending, by the AP and on the same resource unit RU, pilot symbols to the multiple stations specifically includes: sending, by the AP, the pilot symbols to the multiple stations by using a same pilot subcarrier in the same resource unit RU.

With reference to the first aspect, or the first, or the second, or the third possible implementation manner of the first aspect, in a fourth possible implementation manner of the first aspect, the method further includes: sending, by the AP, the downlink data and the pilot symbols to the multiple stations by using a same downlink transmit beam, where a precoding matrix of the same downlink transmit beam includes null space vectors of a matrix $[H_1 \ H_2 \ldots H_m]^T$, $H_i$, where i=1, 2, . . . , m, represents a channel matrix from the AP to a station i, and the AP sends, on the same resource unit RU, the downlink data and the pilot signals to the station i and the multiple stations in a MU-MIMO manner.

With reference to the first aspect, or the first, or the second, or the third, or the fourth possible implementation manner of the first aspect, in a fifth possible implementation manner of the first aspect, the method further includes: receiving, by the AP, uplink data and pilot symbols of the multiple stations by using a same uplink receive beam, where a beamforming matrix of the same uplink receive beam includes null space vectors of a matrix $[G_1 \ G_2 \ldots G_m]^T$, $G_i$, where i=1, 2, . . . , m, represents a channel matrix from the station i to the AP, and the AP receives uplink data and pilot signals that are sent, on the same resource unit RU, by the station i and the multiple stations in the MU-MIMO manner.

According to a second aspect, an embodiment of the present disclosure provides an OFDMA transmission method, including: receiving, by a station, resource allocation information sent by an access point AP; and sending, by the station and at least one of other stations according to the resource allocation information, uplink data and pilot symbols to the AP on a same resource unit RU in a time division multiplexing manner or a code division multiplexing manner, where the RU is one or more subcarriers in a frequency domain, and the resource allocation information is used to indicate the same resource unit RU that is used to transmit the uplink data and the pilots of the station and the at least one of other stations, and indicate an OFDM symbol or a code channel that is corresponding to the uplink data and the pilots of the station and the at least one of other stations and that is in a subframe of the same resource unit RU.

With reference to the second aspect, in a first possible implementation manner of the second aspect, the sending, by the station and at least one of other stations according to the resource allocation information, uplink data and pilot symbols to the AP on a same resource unit RU in a time division multiplexing manner specifically includes: dividing the resource unit RU into multiple subframes in a time domain, where each subframe is corresponding to at least two OFDM symbols in the time domain; and separately sending, by the station and the at least one of other stations, respective uplink data and pilot symbols by using different orthogonal frequency division multiplexing OFDM symbols of each subframe on the same resource unit RU.

With reference to the second aspect, in a second possible implementation manner of the second aspect, the sending, by the station and at least one of other stations according to the resource allocation information, uplink data and pilot symbols to the AP on a same resource unit RU in a code division multiplexing manner specifically includes: dividing the resource unit RU into multiple subframes in a time domain, where each subframe is corresponding to at least two OFDM symbols in the time domain, data subcarriers at a same location in all OFDM symbols of each subframe constitute a data subcarrier group, and pilot subcarriers at a same location in all the OFDM symbols of each subframe constitute a pilot subcarrier group; and sending, by the station and the at least one of other stations, respective uplink data through different code channels in the data subcarrier group in the resource unit RU, and sending respective pilot symbols through different code channels in the pilot subcarrier group in the resource unit RU.

According to a third aspect, an embodiment of the present disclosure provides an access point AP, including: an allocation module, configured to allocate a same resource unit RU to multiple stations, where the RU is one or more subcarriers in a frequency domain; and a sending module, configured to send, on the same resource unit RU, downlink data to the multiple stations in a time division multiplexing manner or a code division multiplexing manner, and send, on the same resource unit RU, pilot symbols to the multiple stations.

With reference to the third aspect, in a first possible implementation manner of the third aspect, the sending module is specifically configured to: divide the resource unit RU into multiple subframes in a time domain, where each subframe is corresponding to at least two OFDM symbols in the time domain; and the sending module separately sends the downlink data of the multiple stations by using different orthogonal frequency division multiplexing OFDM symbols of each subframe on the same resource unit RU.

With reference to the third aspect, in a second possible implementation manner of the third aspect, the sending module is specifically configured to: divide the resource unit RU into multiple subframes in a time domain, where each subframe includes at least two OFDM symbols in the time domain, and data subcarriers at a same location in all OFDM symbols of each subframe are a data subcarrier group; and the sending module sends the downlink data of the multiple stations through different code channels in the data subcarrier group in the resource unit RU.

With reference to the third aspect, or the first or the second possible implementation manner of the third aspect, in a third possible implementation manner of the third aspect, the sending module is specifically configured to: send the pilot symbols to the multiple stations by using a same pilot subcarrier in the same resource unit RU.

With reference to the third aspect, or the first, or the second, or the third possible implementation manner of the third aspect, in a fourth possible implementation manner of the third aspect, the sending module is specifically configured to: send the downlink data and the pilot symbols to the multiple stations by using a same downlink transmit beam, where a precoding matrix of the same downlink transmit beam includes null space vectors of a matrix $[H_1 \ H_2 \ \ldots \ H_m]^T$, $H_i$, where $i=1, 2, \ldots, m$, represents a channel matrix from the access point AP to a station i, and the sending module sends, on the same resource unit RU, the downlink data and the pilot signals to the station i and the multiple stations in a MU-MIMO manner.

With reference to the third aspect, or the first, or the second, or the third, or the fourth possible implementation manner of the third aspect, in a fifth possible implementation manner of the third aspect, the AP further includes a receiving module; and the receiving module is configured to receive uplink data and pilot symbols of the multiple stations by using a same uplink receive beam, where a beamforming matrix of the same uplink receive beam includes null space vectors of a matrix $[G_1 \ G_2 \ \ldots \ G_m]^T$, $G_i$, where $i=1, 2, \ldots, m$, represents a channel matrix from the station i to the AP, and the receiving module receives uplink data and pilot signals that are sent, on the same resource unit RU, by the station i and the multiple stations in the MU-MIMO manner.

According to a fourth aspect, an embodiment of the present disclosure provides a station, including: a receiving module, configured to receive resource allocation information sent by an access point AP; and a sending module, configured to send, together with at least one of other stations according to the resource allocation information, uplink data and pilot symbols to the AP on a same resource unit RU in a time division multiplexing manner or a code division multiplexing manner, where the RU is one or more subcarriers in a frequency domain, and the resource allocation information is used to indicate the same resource unit RU that is used to transmit the uplink data and the pilots of the station and the at least one of other stations, and indicate an OFDM symbol or a code channel that is corresponding to the uplink data and the pilots of the station and the at least one of other stations and that is in a subframe of the same resource unit RU.

With reference to the fourth aspect, in a first possible implementation manner of the fourth aspect, the sending module is specifically configured to: divide the resource unit RU into multiple subframes in a time domain, where each subframe is corresponding to at least two OFDM symbols in the time domain; and the sending module and the at least one of other stations separately send respective uplink data and pilot symbols by using different orthogonal frequency division multiplexing OFDM symbols of each subframe on the same resource unit RU.

With reference to the fourth aspect, in a second possible implementation manner of the fourth aspect, the sending module is specifically configured to: divide the resource unit RU into multiple subframes in a time domain, where each subframe is corresponding to at least two OFDM symbols in the time domain, data subcarriers at a same location in all OFDM symbols of each subframe constitute a data subcarrier group, and pilot subcarriers at a same location in all the OFDM symbols of each subframe constitute a pilot subcarrier group; and the sending module and the at least one of other stations send respective uplink data through different code channels in the data subcarrier group in the resource unit RU, and send respective pilot symbols through different code channels in the pilot subcarrier group in the resource unit RU.

The embodiments of the present disclosure provide an OFDMA transmission method, an access point AP, and a station. The method includes: first, allocating, by an access point AP, a same resource unit RU to multiple stations, where the RU is one or more subcarriers in a frequency domain; and then, sending, by the AP and on the same resource unit RU, downlink data to the multiple stations in a time division multiplexing manner or a code division multiplexing manner; and then, sending, by the AP and on the same resource unit RU, pilot symbols to the multiple stations. In this way, the AP may send, on the same resource unit RU, the downlink data and the pilot symbols to the multiple stations within a limited time, thereby improving resource utilization efficiency.

BRIEF DESCRIPTION OF THE DRAWINGS

To describe the technical solutions in the embodiments of the present disclosure or in the prior art more clearly, the following briefly describes the accompanying drawings required for describing the embodiments or the prior art. Apparently, the accompanying drawings in the following description show merely some embodiments of the present disclosure, and persons of ordinary skill in the art may still derive other drawings from these accompanying drawings without creative efforts.

DETAILED DESCRIPTION

The following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by persons of ordinary skill in the art based on the embodiments of the present disclosure without creative efforts shall fall within the protection scope of the present disclosure.

Figure 1:
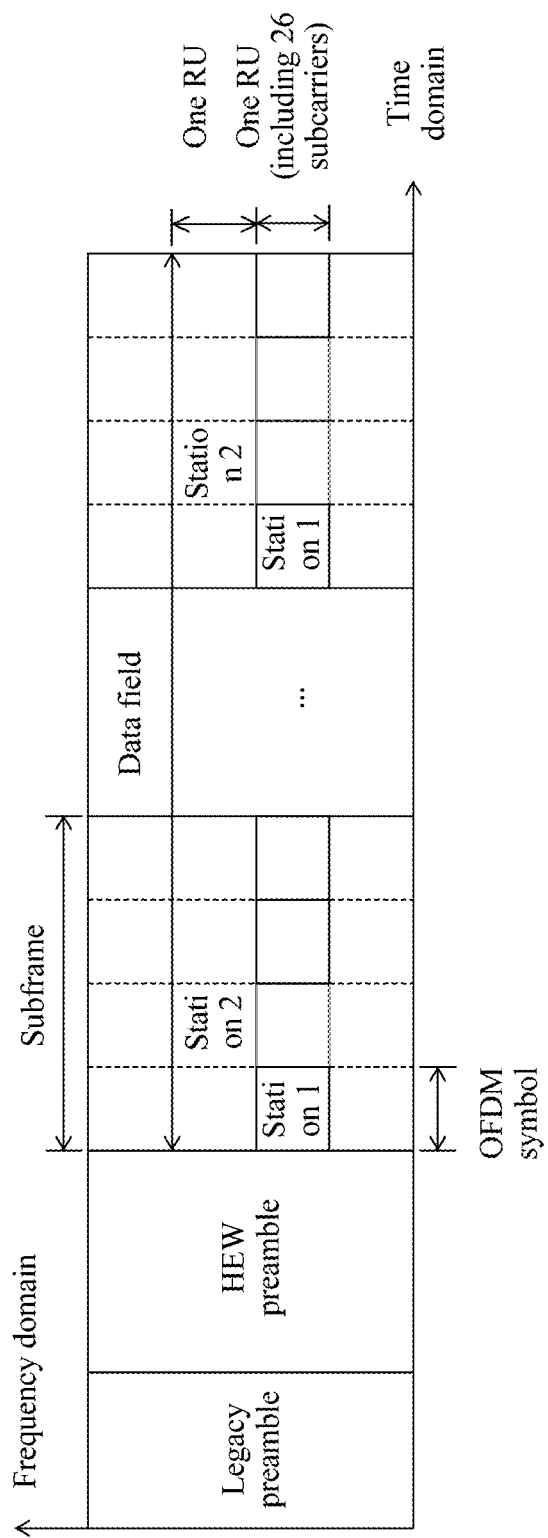
FIG. 1 is a schematic diagram of a frame structure provided in the prior art.
Figure 2:
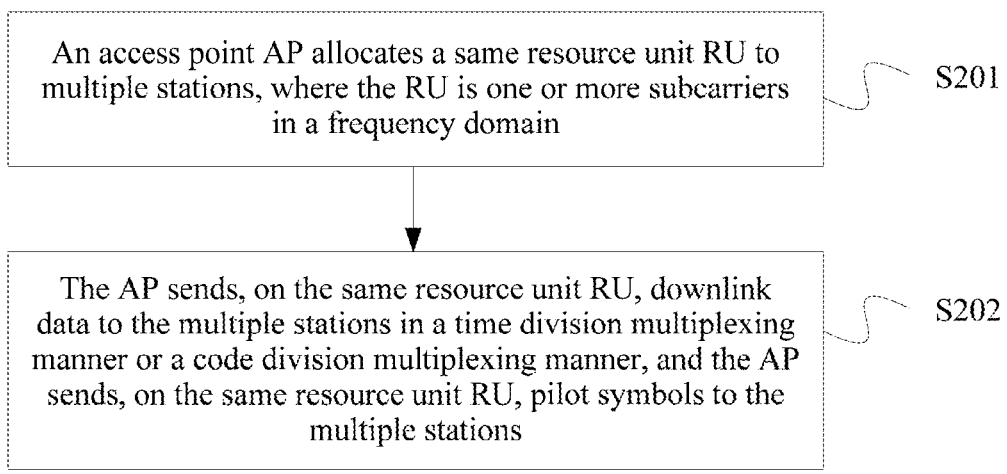
FIG. 2 is a flowchart of an OFDMA transmission method according to an embodiment of the present disclosure.

The technical solutions of the present disclosure are established based on a WLAN technology, which is also referred to as a Wireless Fidelity (WiFi) technology. The technical solutions are applied in an OFDMA scenario, including a multi-user multiple-input multiple-output (MU-MIMO) scenario in an OFDMA. FIG. 1 is a schematic diagram of a frame structure provided in the prior art. As shown in FIG. 1, a station 1 and a station 2 use different RUs to carry information for transmission. To meet a requirement for timely data transmission, a station cannot fully use, in a limited time period, an RU occupied by the station. Therefore, the RU needs to be padded with a useless bit, and low resource utilization is caused. To resolve this problem, an embodiment of the present disclosure provides an OFDMA transmission method. The method is performed by an access point AP. FIG. 2 is a flowchart of an OFDMA transmission method according to an embodiment of the present disclosure. This embodiment is applicable to a scenario in which the access point AP performs downlink transmission. As shown in FIG. 2, the method includes the following specific procedure:

S201: The access point AP allocates a same resource unit RU to multiple stations, where the RU is one or more subcarriers in a frequency domain.

S202: The AP sends, on the same resource unit RU, downlink data to the multiple stations in a time division multiplexing manner or a code division multiplexing manner, and the AP sends, on the same resource unit RU, pilot symbols to the multiple stations.

Specifically, the resource unit RU in this embodiment of the present disclosure is a resource unit in the frequency domain. A smallest resource unit RU includes 26 subcarriers. 24 subcarriers are used to carry useful information and are referred to as data subcarriers, and two pilot subcarriers are used to correct a phase deviation caused by a frequency offset and phase noise. Optionally, that the AP sends, on the same resource unit RU, the data and the pilot symbols to the multiple stations specifically includes: separately sending, by the AP and on the same resource unit RU, downlink data of each of the multiple stations to the station in the time division multiplexing manner or the code division multiplexing manner; and sending, by the AP and on the same resource unit RU, the pilot symbols to the multiple stations.

Figure 3A:
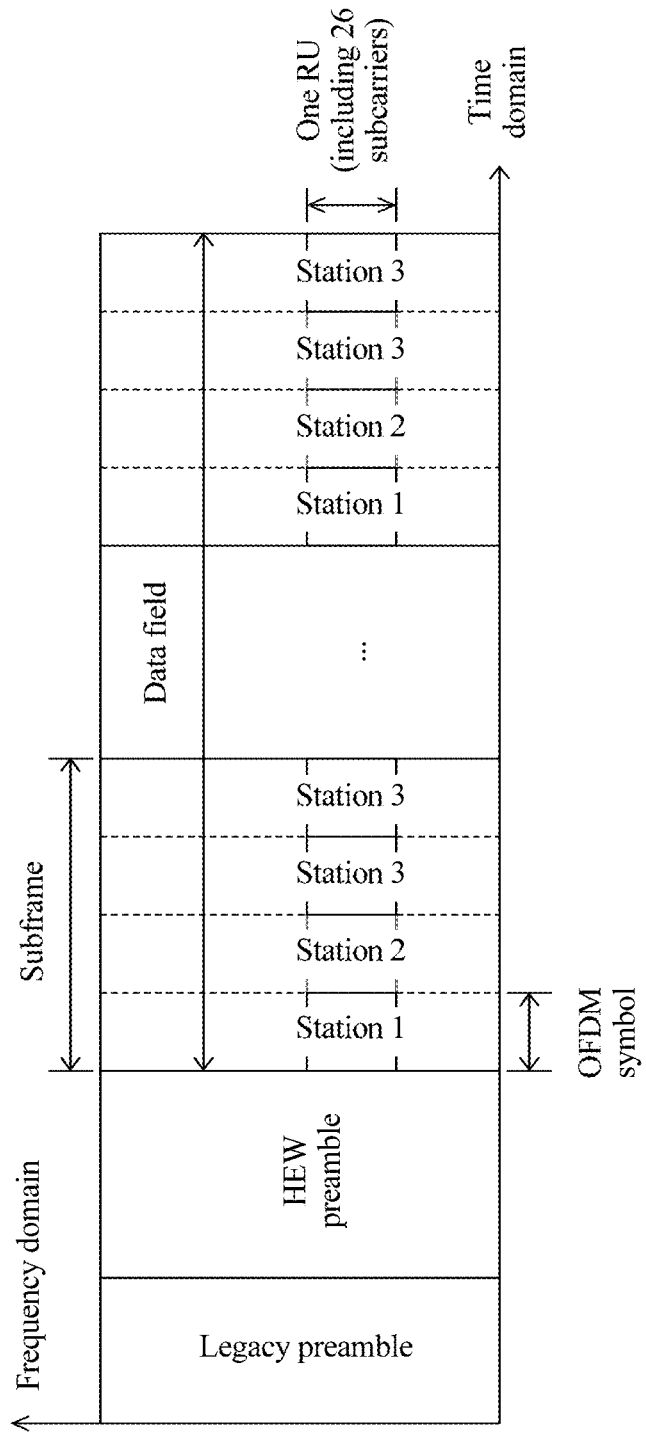
FIG. 3A is schematic diagram 1 of a frame structure according to an embodiment of the present disclosure.

FIG. 3A is schematic diagram 1 of a frame structure according to an embodiment of the present disclosure. As shown in FIG. 3A, a structure of the frame includes parts such as a legacy preamble, a high efficiency WLAN (HEW) preamble, and a data field. The legacy preamble is a preamble shared by WLAN protocol versions 802.11a, 802.11n, 802.11ac, and 802.11ax. The HEW preamble is a preamble specific to the 802.11ax, and is used to transmit physical-layer signaling of the 802.11ax. The data field is used for data transmission. The data field is divided into multiple resource units RUs in a frequency domain. When an access point AP sends a downlink data frame, multiple stations multiplex a same resource unit RU. The resource unit RU is further divided into multiple subframes in a time domain. Each subframe includes at least two OFDM symbols in the time domain. As shown in FIG. 3A, the AP sends, on the same resource unit RU, data to the multiple stations in a time division multiplexing manner. That is, the AP separately sends, in each subframe of the same resource unit RU, a downlink data symbol to each of the multiple stations by separately using a subcarrier resource corresponding to at least one OFDM symbol, and sends, in each subframe of the same resource unit RU, pilot symbols to the multiple stations by using a pilot subcarrier of the same resource unit RU. In addition, when the access point AP sends the downlink data frame, an HEW preamble of the downlink data frame carries first resource allocation information, where the first resource allocation information is used to indicate the same resource unit RU that is used to transmit downlink data of the multiple stations, and an OFDM symbol that is corresponding to data of each of the multiple stations and that is in a subframe of the same resource unit RU.

For example, in the embodiment shown in FIG. 3A, a same resource unit RU is allocated to a station 1, a station 2, and a station 3, and the AP sends data to the three stations in the time division multiplexing manner. A subframe is corresponding to four OFDM symbols in the time domain. The station 1 and the station 2 respectively occupy a first OFDM symbol and a second OFDM symbol of each subframe, and the station 3 occupies a third OFDM symbol and a fourth OFDM symbol of each subframe. Therefore, it is implemented that the three stations multiplex one RU resource.

Figure 3B:
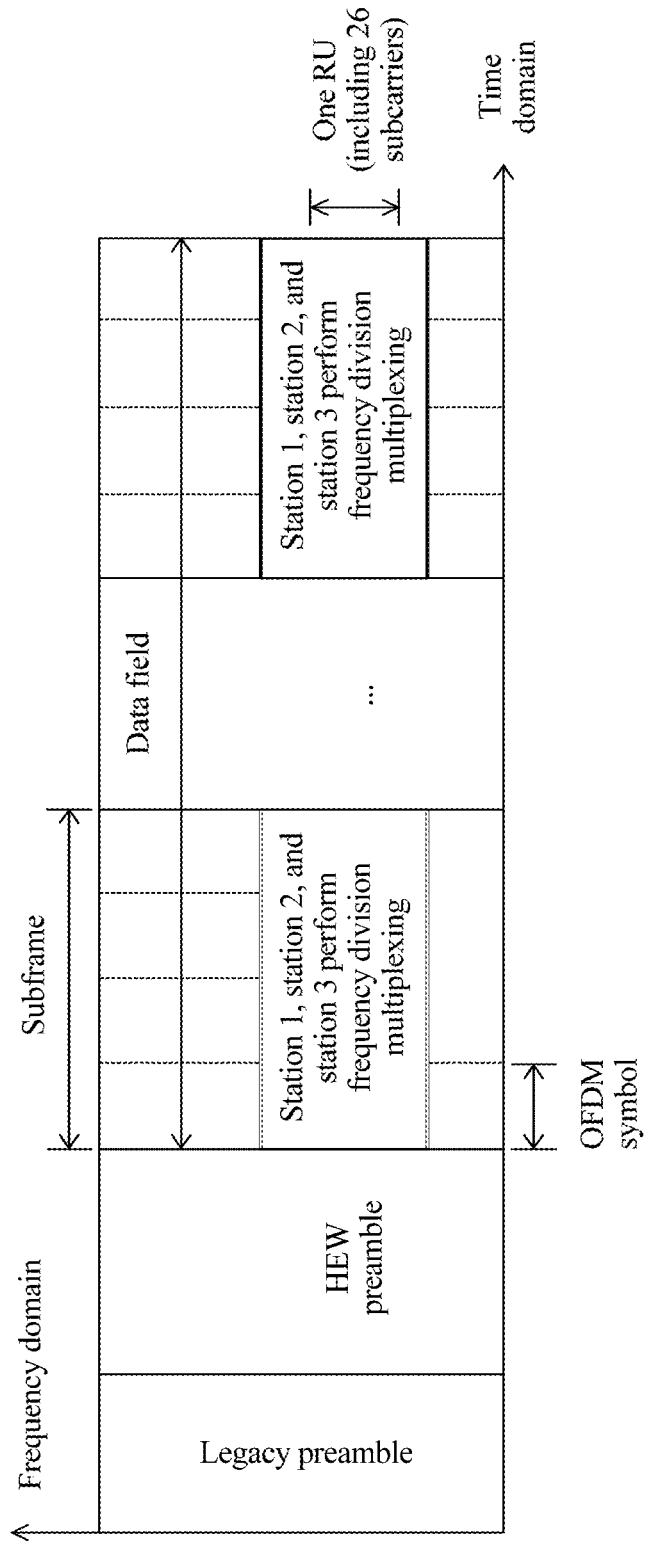
FIG. 3B is schematic diagram 2 of another frame structure according to an embodiment of the present disclosure.

FIG. 3B is schematic diagram 2 of another frame structure according to an embodiment of the present disclosure. As shown in FIG. 3B, a structure of the frame still includes parts such as a legacy preamble, an HEW preamble, and a data field. The data field is divided into multiple resource units RUs in a frequency domain. Data of multiple stations is multiplexed on a same resource unit RU. The same resource unit RU is further divided into multiple subframes in a time domain. Each subframe includes at least two corresponding OFDM symbols in the time domain. The frame structure in this embodiment differs from the frame structure in FIG. 3A as follows: Data subcarriers at a same location in all OFDM symbols of each subframe separately constitute a data subcarrier group, and an AP sends a downlink data symbol to the multiple stations in a code division multiplexing manner; that is, the AP sends, in each subframe of the same resource unit RU, a downlink data symbol of each of the multiple stations to the station by separately using at least one code channel in each data subcarrier group. In addition, when the access point AP sends a downlink data frame, an HEW preamble of the downlink data frame carries first resource allocation information, where the first resource allocation information is used to indicate the same resource unit RU that is used to transmit downlink data of the multiple stations, and a code channel that is corresponding to data of each of the multiple stations and that is in a data subcarrier group in each subframe of the same resource unit RU.

For example, in the embodiment shown in FIG. 3B, a same resource unit RU is allocated to a station 1, a station 2, and a station 3, and the AP sends a data symbol to the three stations in the code division multiplexing manner. Each subframe is corresponding to four OFDM symbols in the time domain. A total of four subcarriers at a same location in each subframe constitute a data subcarrier group. Therefore, the RU has a total of 24 data subcarrier groups in each subframe. Each data subcarrier group carries data of the three stations in the code division multiplexing manner. For example, the station 1 and the station 2 respectively occupy a first code channel and a second code channel in a data subcarrier group in each subframe, and the station 3 occupies a third code channel and a fourth code channel in each subframe. Therefore, it is implemented that the three stations multiplex one RU resource. Specifically, if one data symbol of the station 1, one data symbol of the station 2, and two data symbols of the station 3 are respectively $S_1$, $S_2$, $S_3$, and $S_4$ symbols transmitted on a data subcarrier group are $X_1$, $X_2$, $X_3$, and $X_4$, where $$\begin{bmatrix} x_1 \\ x_2 \\ x_3 \\ x_4 \end{bmatrix} = G \begin{bmatrix} s_1 \\ s_2 \\ s_3 \\ s_4 \end{bmatrix}$$

The matrix G herein is a 4×4 orthogonal matrix, for example, the matrix G may be the following matrix.

$$G = \frac{1}{2}\begin{bmatrix} 1 & -1 & 1 & 1 \\ 1 & 1 & -1 & 1 \\ 1 & 1 & 1 & -1 \\ -1 & 1 & 1 & 1 \end{bmatrix}$$

Herein, the station 1 and the station 2 respectively occupy a first code channel and a second code channel that are corresponding to a vector [1−1 1 1] and a vector [1 1−1 1], and the station 3 occupies a third code channel and a fourth code channel that are corresponding to a vector [1 1 1−1] and a vector [−1 1 1 1].

This embodiment provides an OFDMA transmission method, including: first, allocating, by an access point AP, a same resource unit RU to multiple stations; and then, sending, by the AP and on the same resource unit RU, downlink data and pilot symbols to the multiple stations. In this way, the AP may send, on the same resource unit RU, the downlink data and the pilot symbols to the multiple stations within a limited time, thereby avoiding a disadvantage in the prior art that the AP can send, on a resource unit RU, downlink data and a pilot symbol of only one station, and improving resource utilization efficiency.

Further, in a downlink transmission process, the AP sends the pilot symbols to the multiple stations by using a same pilot subcarrier in the same resource unit RU. The multiple stations correct, by using the same pilot subcarrier, a phase deviation caused by a residual frequency offset and phase noise that are between the multiple stations and the AP.

Figure 4:
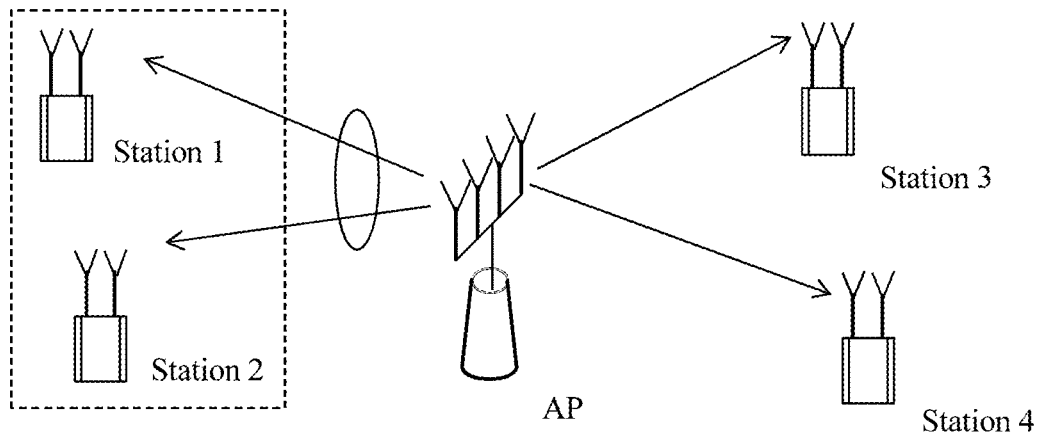
FIG. 4 is a schematic diagram of a downlink transmit beam multiplexed by multiple stations according to an embodiment of the present disclosure.

Still further, during downlink multi-user multiple-input multiple-output (MU-MIMO) transmission, multiple stations multiplex a same RU in the foregoing manner. The AP sends data and pilot symbols to the multiple stations by using a same downlink transmit beam (that is, downlink precoding). Typically, a precoding matrix of the same downlink transmit beam includes null space vectors of a matrix $[H_1\ H_2\ \ldots\ H_m]^T$, and $H_i$, where i=1, 2, . . . , m, represents a channel matrix from the AP to a station i. The multiple stations are considered as one virtual station herein. The foregoing station i and the foregoing multiple stations multiplex a same resource unit RU. The AP sends, on the same resource unit RU, downlink data and pilot signals to the station i and the multiple stations in a MU-MIMO manner. FIG. 4 is a schematic diagram of a downlink transmit beam multiplexed by multiple stations according to an embodiment of the present disclosure. As shown in FIG. 4, it is assumed that an AP allocates a same resource unit RU to a station 1 and a station 2, the station 1 and the station 2 may be considered as one virtual station, and a station 3 and a station 4 multiplex the resource unit RU together with the station 1 and the station 2 in a downlink MU-MIMO manner. In this case, null space vectors of channel matrices of the station 3 and the station 4 may be obtained based on the channel matrices of the station 3 and the station 4. The null space vectors constitute a precoding matrix that is used to send beams of the station 1 and the station 2. Null space vectors of a matrix are generally obtained by performing singular value decomposition on the matrix.

Based on the foregoing embodiment, this embodiment further resolves how to determine a downlink transmit beam. The downlink transmit beam is a transmit beam required when multiple stations are considered as one virtual station. The multiple stations use a same resource unit RU.

Figure 5:
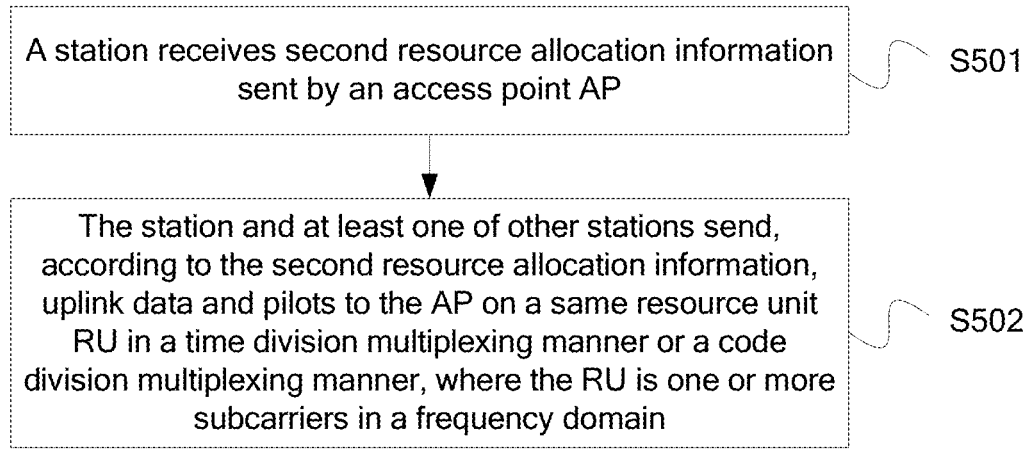
FIG. 5 is a flowchart of an OFDMA transmission method according to another embodiment of the present disclosure.

FIG. 5 is a flowchart of an OFDMA transmission method according to another embodiment of the present disclosure. This embodiment is applicable to a scenario in which a station performs uplink transmission. The method is performed by the station. The method includes the following specific procedure:

S501: The station receives resource allocation information sent by an access point AP.

S502: The station and at least one of other stations send, according to the resource allocation information, uplink data and pilots to the AP on a same resource unit RU in a time division multiplexing manner or a code division multiplexing manner, where the RU is one or more subcarriers in a frequency domain.

The resource allocation information is used to indicate the same resource unit RU that is used to transmit the uplink data and the pilots of the station and the at least one of other stations, and indicate an OFDM symbol or a code channel that is corresponding to the uplink data and the pilots of the station and the at least one of other stations and that is in a subframe of the same resource unit RU. Specifically, the access point AP generally allocates, to the station, a resource required by the AP. When the station receives the resource allocation information sent by the access point AP, the station may determine a subcarrier resource used to transmit the uplink data, and the same resource unit RU is allocated to multiple stations for uplink data transmission. The resource unit RU in this embodiment of the present disclosure is a resource unit in the frequency domain. A smallest resource unit RU includes 26 subcarriers. 24 subcarriers are used to carry useful information and are referred to as data subcarriers, and two pilot subcarriers are used to correct a phase deviation caused by a frequency offset and phase noise.

In an implementation manner, that the station and at least one of other stations send, according to the resource allocation information, uplink data and pilot symbols to the AP on a same resource unit RU in a time division multiplexing manner specifically includes: dividing the resource unit RU into multiple subframes in a time domain, where each subframe is corresponding to at least two OFDM symbols in the time domain; and separately sending, by the station and the at least one of other stations, respective uplink data and pilot symbols by using different orthogonal frequency division multiplexing OFDM symbols of each subframe on the same resource unit RU. As shown in FIG. 3A, the resource allocation information includes: A station 1 and a station 2 respectively occupy a first OFDM symbol and a second OFDM symbol that are of each subframe, and a station 3 occupies a third OFDM symbol and a fourth OFDM symbol that are of each subframe. Therefore, it is implemented that the three stations multiplex a same resource unit RU. According to the resource allocation information, in an uplink direction, on different OFDM symbols of each subframe, corresponding uplink data and pilot symbols of each of the foregoing three stations 1 to 3 are respectively carried on a data subcarrier and a pilot subcarrier, and are respectively sent by the stations 1 to 3. After receiving the uplink data and the pilot symbols sent by all the foregoing stations, the AP separately corrects, by using a pilot symbol of each station, a phase deviation caused by a residual frequency offset and phase noise that are between the AP and the station.

In another implementation manner, that the station and at least one of other stations send, according to the resource allocation information, uplink data and pilot symbols to the AP on a same resource unit RU in a code division multiplexing manner specifically includes: dividing the resource unit RU into multiple subframes in a time domain, where each subframe is corresponding to at least two OFDM symbols in the time domain, data subcarriers at a same location in all OFDM symbols of each subframe constitute a data subcarrier group, and pilot subcarriers at a same location in all the OFDM symbols of each subframe constitute a pilot subcarrier group; and sending, by the station and the at least one of other stations, respective uplink data through different code channels in the data subcarrier group in the resource unit RU, and sending respective pilot symbols through different code channels in the pilot subcarrier group in the resource unit RU. As shown in FIG. 3B, a station 1, a station 2, and a station 3 multiplex a same resource unit RU. Each subframe includes four OFDM symbols in the time domain. A total of four subcarriers at a same location in each subframe constitute a subcarrier group. Therefore, the RU has a total of 24 data subcarrier groups and two pilot subcarrier groups in each subframe. In each data subcarrier group, data symbols of the three stations are carried in the code division multiplexing manner. In each pilot subcarrier group, pilot symbols of the three stations are also carried in the code division multiplexing manner. The station 1 and the station 2 respectively occupy a first code channel and a second code channel in a subcarrier group in each subframe, and the station 3 occupies a third code channel and a fourth code channel in each subframe. Therefore, it is implemented that the three stations multiplex one RU resource.

This embodiment of the present disclosure provides an OFDMA transmission method. The method includes: receiving, by a station, resource allocation information sent by an access point AP; and sending, by the station and at least one of other stations according to the resource allocation information, uplink data and pilot symbols to the AP on a same resource unit RU in a time division multiplexing manner or a code division multiplexing manner, thereby improving resource utilization efficiency.

It should be noted that in an uplink data transmission direction, multiple stations that multiplex a same RU transmit different pilot symbols to the AP, so that the AP corrects, by using a pilot symbol of each station, a phase deviation caused by a residual frequency offset and corresponding noise that are between the AP and the station.

In uplink MU-MIMO, the AP receives uplink data and pilot symbols of the multiple stations by using a same uplink receive beam. A beamforming matrix of the same uplink receive beam includes null space vectors of a matrix $[G_1 G_2 \ldots G_m]^T$, $G_i$, where i=1, 2, . . . , m, represents a channel matrix from the station i to the AP, and the AP receives uplink data and pilot signals that are sent, on the same resource unit RU, by the station i and the multiple stations in the MU-MIMO manner.

Figure 6:
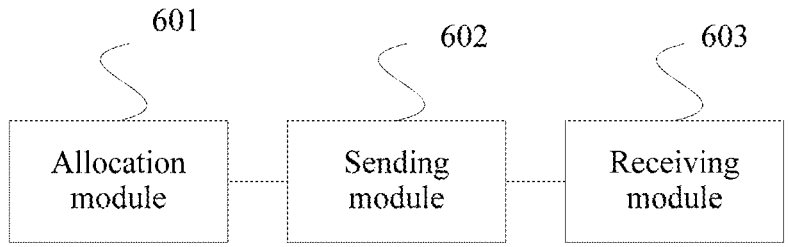
FIG. 6 is a schematic structural diagram of an access point AP according to an embodiment of the present disclosure.

FIG. 6 is a schematic structural diagram of an access point AP according to an embodiment of the present disclosure. The access point AP includes: an allocation module 601, configured to allocate a same resource unit RU to multiple stations, where the RU is one or more subcarriers in a frequency domain; and a sending module 602, configured to send, on the same resource unit RU, downlink data to the multiple stations in a time division multiplexing manner or a code division multiplexing manner, and send, on the same resource unit RU, pilot symbols to the multiple stations.

In an optional manner, when the AP sends the downlink data on the same resource unit RU in the time division multiplexing manner, the resource unit RU is divided into multiple subframes in a time domain, and each subframe is corresponding to at least two OFDM symbols in the time domain; and the sending module 602 separately sends the downlink data of the multiple stations by using different orthogonal frequency division multiplexing OFDM symbols of each subframe on the same resource unit RU.

In another optional manner, when the AP sends the downlink data on the same resource unit RU in the code division multiplexing manner, the resource unit RU is divided into multiple subframes in a time domain, each subframe includes at least two OFDM symbols in the time domain, and data subcarriers at a same location in all OFDM symbols of each subframe are a data subcarrier group; and the sending module 602 sends the downlink data of the multiple stations through different code channels in the data subcarrier group in the resource unit RU.

Optionally, the sending module 602 is specifically configured to send the pilot symbols to the multiple stations by using a same pilot subcarrier in the same resource unit RU.

Further, the sending module 602 is specifically configured to send the downlink data and the pilot symbols to the multiple stations by using a same downlink transmit beam. A precoding matrix of the same downlink transmit beam includes null space vectors of a matrix $[H_1\ H_2\ \ldots\ H_m]^T$, and $H_i$, where i=1, 2, . . . , m, represents a channel matrix from the access point AP to a station i. The sending module sends, on the same resource unit RU, the downlink data and the pilot signals to the station i and the multiple stations in a MU-MIMO manner.

Still further, the access point AP further includes a receiving module 603. The receiving module 603 is configured to receive uplink data and pilot symbols of the multiple stations by using a same uplink receive beam. A beamforming matrix of the same uplink receive beam includes null space vectors of a matrix $[G_1\ G_2\ \ldots\ G_m]^T$, and $G_i$, where i=1, 2, . . . , m, represents a channel matrix from the station i to the AP. The receiving module receives uplink data and pilot signals that are sent, on the same resource unit RU, by the station i and the multiple stations in the MU-MIMO manner.

The access point AP provided in this embodiment is configured to perform the technical solution for implementing the corresponding OFDMA transmission method in FIG. 2, and implementation principles and technical effects of the AP are similar and are not described herein again.

Figure 7:
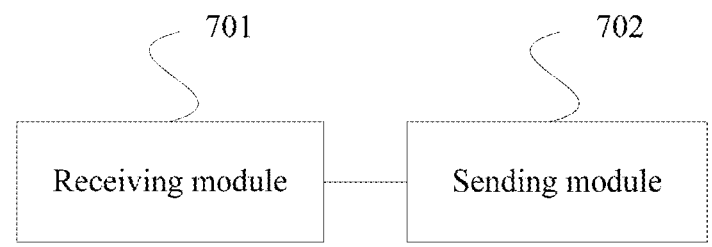
FIG. 7 is a schematic structural diagram of a station according to an embodiment of the present disclosure.

FIG. 7 is a schematic structural diagram of a station according to an embodiment of the present disclosure. The station includes: a receiving module 701, configured to receive resource allocation information sent by an access point AP; and a sending module 702, configured to send, together with at least one of other stations according to the resource allocation information, uplink data and pilot symbols to the AP on a same resource unit RU in a time division multiplexing manner or a code division multiplexing manner, where the RU is one or more subcarriers in a frequency domain. The resource allocation information is used to indicate the same resource unit RU that is used to transmit the uplink data and the pilots of the station and the at least one of other stations, and indicate an OFDM symbol or a code channel that is corresponding to the uplink data and the pilots of the station and the at least one of other stations and that is in a subframe of the same resource unit RU. In an optional manner, the sending module 702 is specifically configured to divide the resource unit RU into multiple subframes in a time domain, where each subframe is corresponding to at least two OFDM symbols in the time domain; and the sending module 702 and the at least one of other stations separately send respective uplink data and pilot symbols by using different orthogonal frequency division multiplexing OFDM symbols of each subframe on the same resource unit RU. In another optional manner, the sending module 702 is specifically configured to divide the resource unit RU into multiple subframes in a time domain, where each subframe is corresponding to at least two OFDM symbols in the time domain, data subcarriers at a same location in all OFDM symbols of each subframe constitute a data subcarrier group, and pilot subcarriers at a same location in all the OFDM symbols of each subframe constitute a pilot subcarrier group; and the sending module 902 and the at least one of other stations send respective uplink data through different code channels in the data subcarrier group in the resource unit RU, and send respective pilot symbols through different code channels in the pilot subcarrier group in the resource unit RU.

The station provided in this embodiment is configured to perform the technical solution for implementing the corresponding OFDMA transmission method in FIG. 5, and implementation principles and technical effects are similar and are not described herein again.

Figure 8:
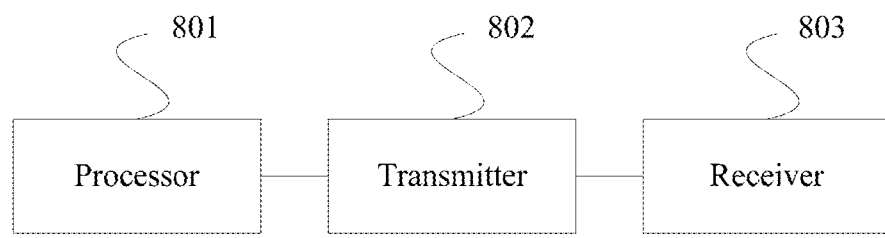
FIG. 8 is a schematic structural diagram of an access point AP according to another embodiment of the present disclosure.

FIG. 8 is a schematic structural diagram of an access point AP according to another embodiment of the present disclosure. The access point AP includes a processor 801, configured to allocate a same resource unit RU to multiple stations, where the RU is one or more subcarriers in a frequency domain; and a transmitter 802, configured to send, on the same resource unit RU, downlink data to the multiple stations in a time division multiplexing manner or a code division multiplexing manner, and send, on the same resource unit RU, pilot symbols to the multiple stations.

In an optional manner, the transmitter 802 is specifically configured to divide the resource unit RU into multiple subframes in a time domain, where each subframe is corresponding to at least two OFDM symbols in the time domain; and the transmitter 802 separately sends the downlink data of the multiple stations by using different orthogonal frequency division multiplexing OFDM symbols of each subframe on the same resource unit RU.

In another optional manner, the transmitter 802 is specifically configured to: divide the resource unit RU into multiple subframes in a time domain, where each subframe includes at least two OFDM symbols in the time domain, and data subcarriers at a same location in all OFDM symbols of each subframe are a data subcarrier group; and the transmitter 802 sends the downlink data of the multiple stations through different code channels in the data subcarrier group in the resource unit RU.

Optionally, the transmitter 802 is specifically configured to send the pilot symbols to the multiple stations by using a same pilot subcarrier in the same resource unit RU.

Further, the transmitter 802 is specifically configured to send the downlink data and the pilot symbols to the multiple stations by using a same downlink transmit beam. A precoding matrix of the same downlink transmit beam includes null space vectors of a matrix $[H_1\ H_2\ \ldots\ H_m]^T$, and $H_i$, where i=1, 2, . . . , m, represents a channel matrix from the access point AP to a station i. The transmitter sends, on the same resource unit RU, the downlink data and the pilot signals to the station i and the multiple stations in a MU-MIMO manner.

Still further, the AP further includes a receiver 803. The receiver 803 is configured to receive uplink data and pilot symbols of the multiple stations by using a same uplink receive beam. A beamforming matrix of the same uplink receive beam includes null space vectors of a matrix $[G_1 G_2 \ldots G_m]^T$, and $G_i$, where $i=1, 2, \ldots, m$, represents a channel matrix from the station i to the AP. The receiver receives uplink data and pilot signals that are sent, on the same resource unit RU, by the station i and the multiple stations in the MU-MIMO manner.

The access point AP provided in this embodiment is configured to perform the technical solution for implementing the corresponding OFDMA transmission method in FIG. 2, and implementation principles and technical effects are similar and are not described herein again.

Figure 9:
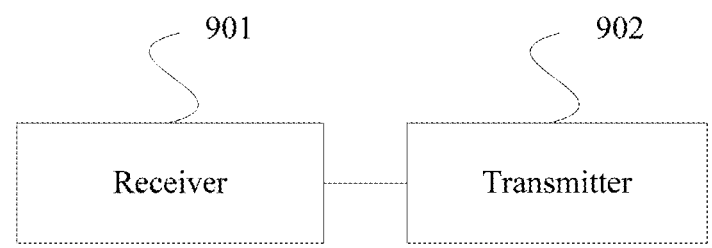
FIG. 9 is a schematic structural diagram of a station according to another embodiment of the present disclosure.

FIG. 9 is a schematic structural diagram of a station according to another embodiment of the present disclosure. The station includes:

a receiver 901, configured to receive resource allocation information sent by an access point AP; and a transmitter 902, configured to send, together with at least one of other stations according to the resource allocation information, uplink data and pilot symbols to the AP on a same resource unit RU in a time division multiplexing manner or a code division multiplexing manner, where the RU is one or more subcarriers in a frequency domain, and the resource allocation information is used to indicate the same resource unit RU that is used to transmit the uplink data and the pilots of the station and the at least one of other stations, and indicate an OFDM symbol or a code channel that is corresponding to the uplink data and the pilots of the station and the at least one of other stations and that is in a subframe of the same resource unit RU.

In an optional manner, the transmitter 902 is specifically configured to divide the resource unit RU into multiple subframes in a time domain, where each subframe is corresponding to at least two OFDM symbols in the time domain; and the transmitter 902 and the at least one of other stations separately send respective uplink data and pilot symbols by using different orthogonal frequency division multiplexing OFDM symbols of each subframe on the same resource unit RU.

In another optional manner, the transmitter 902 is specifically configured to divide the resource unit RU into multiple subframes in a time domain, where each subframe is corresponding to at least two OFDM symbols in the time domain, data subcarriers at a same location in all OFDM symbols of each subframe constitute a data subcarrier group, and pilot subcarriers at a same location in all the OFDM symbols of each subframe constitute a pilot subcarrier group; and the transmitter 902 and the at least one of other stations send respective uplink data through different code channels in the data subcarrier group in the resource unit RU, and send respective pilot symbols through different code channels in the pilot subcarrier group in the resource unit RU.

The station provided in this embodiment is configured to perform the technical solution for implementing the corresponding OFDMA transmission method in FIG. 5, and implementation principles and technical effects are similar and are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. An OFDMA transmission method, comprising:
allocating, by an access point (AP), a same resource unit (RU) to multiple stations, wherein the RU includes one or more subcarriers in a frequency domain, wherein the one or more subcarriers comprise a first subcarrier corresponding to a first orthogonal frequency division multiplexing (OFDM)symbol and a first station;
dividing the RU into multiple subframes in a time domain, wherein each subframe corresponds to at least two OFDM symbols in the time domain; and
separately sending, by the AP and on the same RU, the downlink data of the multiple stations by using different OFDM symbols of each subframe on the same RU, wherein the AP sends downlink data to the first station using the first subcarrier, and sending, by the AP and on the same RU, pilot symbols to the multiple stations.

2. The method according to claim 1, wherein sending, by the AP and on the same RU, pilot symbols to the multiple stations comprises:
sending, by the AP, the pilot symbols to the multiple stations by using a same pilot subcarrier in the same RU.

3. The method according to claim 1, further comprising:
sending, by the AP, the downlink data and the pilot symbols to the multiple stations by using a same downlink transmit beam, wherein a precoding matrix of the same downlink transmit beam comprises null space vectors of a matrix $[H1\ H2 \ldots Hm]T$, Hi, wherein $i=1, 2, \ldots, m$, represents a channel matrix from the AP to a station i, and wherein the AP sends, on the same RU, the downlink data and the pilot signals to the station i and the multiple stations in a multi-user multiple-input multiple output (MU-MIMO) manner.

4. The method according to claim 1, further comprising:
receiving, by the AP, uplink data and pilot symbols of the multiple stations by using a same uplink receive beam, wherein a beamforming matrix of the same uplink receive beam comprises null space vectors of a matrix $[G1\ G2 \ldots Gm]T$, Gi, wherein $i=1, 2, \ldots, m$, represents a channel matrix from the station i to the AP, and wherein the AP receives uplink data and pilot signals that are sent, on the same resource unit RU, by the station i and the multiple stations in a multi-user multiple-input multiple output (MU-MIMO).

5. An OFDMA transmission method, comprising:
allocating, by an access point (AP), a same resource unit (RU) to multiple stations, wherein the RU includes one or more subcarriers in a frequency domain, wherein the one or more subcarriers comprise a first subcarrier corresponding to a first orthogonal frequency division multiplexing (OFDM)symbol and a first station;

dividing the RU into multiple subframes in a time domain, wherein each subframe comprises at least two OFDM symbols in the time domain, and data subcarriers at a same location in all OFDM symbols of each subframe are a data subcarrier group; and sending, by the AP and on the same RU, the downlink data of the multiple stations through different code channels in the data subcarrier group in the RU, wherein the AP sends downlink data to the first station using the first subcarrier, and sending, by the AP and on the same RU, pilot symbols to the multiple stations.

6. The method according to claim 5, wherein sending, by the AP and on the same RU, pilot symbols to the multiple stations comprises:

sending, by the AP, the pilot symbols to the multiple stations by using a same pilot subcarrier in the same RU.

7. The method according to claim 5, further comprising:

sending, by the AP, the downlink data and the pilot symbols to the multiple stations by using a same downlink transmit beam, wherein a precoding matrix of the same downlink transmit beam comprises null space vectors of a matrix [H1 H2 . . . Hm]T, Hi, wherein i=1, 2, . . . , m, represents a channel matrix from the AP to a station i, and wherein the AP sends, on the same RU, the downlink data and the pilot signals to the station i and the multiple stations in a multi-user multiple-input multiple output (MU-MIMO) manner.

8. The method according to claim 5, further comprising:

receiving, by the AP, uplink data and pilot symbols of the multiple stations by using a same uplink receive beam, wherein a beamforming matrix of the same uplink receive beam comprises null space vectors of a matrix [G1 G2 . . . Gm]T, Gi, wherein i=1, 2, . . . , m, represents a channel matrix from the station i to the AP, and wherein the AP receives uplink data and pilot signals that are sent, on the same resource unit RU, by the station i and the multiple stations in a multi-user multiple-input multiple output (MU-MIMO).

9. An OFDMA transmission method, comprising:

receiving, by a station, resource allocation information sent by an access point (AP);

dividing a resource unit (RU) into multiple subframes in a time domain, wherein the RU is one or more subcarriers in a frequency domain, and wherein each subframe corresponds to at least two OFDM symbols in the time domain, and separately sending, by the station and at least one other station, according to the resource allocation information, respective uplink data and pilot symbols by using different OFDM symbols of each subframe on the same RU, wherein the resource allocation information is used to indicate the same RU used to transmit the uplink data and the pilot symbols of the station and the other station, and indicate an orthogonal frequency division multiplexing (OFDM) symbol or a code channel that corresponds to the uplink data and the pilot symbols of the station and the other station and that is in a subframe of the same RU.

10. An OFDMA transmission method, comprising:

receiving, by a station, resource allocation information sent by an access point (AP);

dividing a resource unit (RU) into multiple subframes in a time domain, wherein the RU is one or more subcarriers in a frequency domain, and wherein each subframe is corresponding to at least two OFDM symbols in the time domain, data subcarriers at a same location in all OFDM symbols of each subframe constitute a data subcarrier group, and pilot subcarriers at a same location in all the OFDM symbols of each subframe constitute a pilot subcarrier group; and sending, by the station and at least one other station, according to the resource allocation information, respective uplink data through different code channels in the data subcarrier group in the RU, and sending respective pilot symbols through different code channels in the pilot subcarrier group in the RU, wherein the resource allocation information is used to indicate the same RU used to transmit the uplink data and the pilot symbols of the station and the other station, and indicate an orthogonal frequency division multiplexing (OFDM) symbol or a code channel that corresponds to the uplink data and the pilot symbols of the station and the other station and that is in a subframe of the same RU.

11. An apparatus for use on an access point (AP) side, the apparatus comprising:

an allocation module, configured to allocate a same resource unit (RU) to multiple stations, wherein the RU includes one or more subcarriers in a frequency domain, and wherein the one or more subcarriers comprise a first subcarrier corresponding to a first orthogonal frequency division multiplexing (OFDM) symbol and a first station; and a sending module, configured to:

divide the RU into multiple subframes in a time domain, wherein each subframe corresponds to at least two OFDM symbols in the time domain; and separately send, on the same RU, the downlink data of the multiple stations by using OFDM symbols of each subframe on the same RU, wherein the AP sends downlink data to the first station using the first subcarrier, and sends, on the same RU, pilot symbols to the multiple stations.

12. The apparatus according to claim 11, wherein the sending module is configured to:

send the pilot symbols to the multiple stations by using a same pilot subcarrier in the same RU.

13. The apparatus according to claim 11, wherein the sending module is configured to:

send the downlink data and the pilot symbols to the multiple stations by using a same downlink transmit beam, wherein a precoding matrix of the same downlink transmit beam comprises null space vectors of a matrix [H1 H2 . . . Hm]T, Hi, wherein i=1, 2, . . . , m, represents a channel matrix from the access point AP to a station I; and send, on the same RU, the downlink data and the pilot signals to the station i and the multiple stations in a multi-user multiple-input multiple output (MU-MIMO) manner.

14. The apparatus according to claim 11, further comprising a receiving module configured to:

receive uplink data and pilot symbols of the multiple stations by using a same uplink receive beam, wherein a beamforming matrix of the same uplink receive beam comprises null space vectors of a matrix [G1 G2 . . . Gm]T, Gi, wherein i=1, 2, . . . , m, represents a channel matrix from the station i to the AP; and receive uplink data and pilot signals that are sent, on the same RU, by the station i and the multiple stations in a multi-user multiple-input multiple output (MU-MIMO) manner.

15. An apparatus for use on an access point (AP) side, the apparatus comprising:

an allocation module, configured to allocate a same resource unit (RU) to multiple stations, wherein the RU includes one or more subcarriers in a frequency domain, and wherein the one or more subcarriers comprise a first subcarrier corresponding to a first orthogonal frequency division multiplexing (OFDM) symbol and a first station; and a sending module, configured to:

divide the RU into multiple subframes in a time domain, wherein each subframe comprises at least two OFDM symbols in the time domain, and data subcarriers at a same location in all OFDM symbols of each subframe are a data subcarrier group; and send, on the same RU, the downlink data of the multiple stations through different code channels in the data subcarrier group in the RU, wherein the AP sends downlink data to the first station using the first subcarrier, and send, on the same RU, pilot symbols to the multiple stations.

16. The apparatus according to claim 15, wherein the sending module is configured to:

send the pilot symbols to the multiple stations by using a same pilot subcarrier in the same RU.

17. The apparatus according to claim 15, wherein the sending module is configured to:

send the downlink data and the pilot symbols to the multiple stations by using a same downlink transmit beam, wherein a precoding matrix of the same downlink transmit beam comprises null space vectors of a matrix [H1 H2 ... Hm]T, Hi, wherein i=1, 2, ..., m, represents a channel matrix from the access point AP to a station I; and send, on the same RU, the downlink data and the pilot signals to the station i and the multiple stations in a multi-user multiple-input multiple output (MU-MIMO) manner.

18. The apparatus according to claim 15, further comprising a receiving module configured to:

receive uplink data and pilot symbols of the multiple stations by using a same uplink receive beam, wherein a beamforming matrix of the same uplink receive beam comprises null space vectors of a matrix [G1 G2 ... Gm]T, Gi, wherein i=1, 2, ..., m, represents a channel matrix from the station i to the AP; and receive uplink data and pilot signals that are sent, on the same RU, by the station i and the multiple stations in a multi-user multiple-input multiple output (MU-MIMO) manner.

19. An apparatus for use on a station side, the apparatus comprising:

a receiving module, configured to receive resource allocation information sent by an access point (AP);

a sending module, configured to divide a resource unit (RU) into multiple subframes in a time domain, wherein each subframe corresponds to at least two OFDM symbols in the time domain, wherein the RU includes one or more subcarriers in a frequency domain; and separately send, together with another station according to the resource allocation information, respective uplink data and pilot symbols by using different OFDM symbols of each subframe on the same RU, wherein the resource allocation information is used to indicate the same RU that is used to transmit the uplink data and the pilots of the station and the other station, and indicate an orthogonal frequency division multiplexing (OFDM) symbol or a code channel that corresponds to the uplink data and the pilots of the station and the other station and that is in a subframe of the same RU.

20. An apparatus for use on a station side, the apparatus comprising:

a receiving module, configured to receive resource allocation information sent by an access point (AP);

a sending module, configured to divide a resource unit (RU) into multiple subframes in a time domain, wherein the RU includes one or more subcarriers in a frequency domain, and wherein each subframe corresponds to at least two OFDM symbols in the time domain, data subcarriers at a same location in all OFDM symbols of each subframe constitute a data subcarrier group, and pilot subcarriers at a same location in all the OFDM symbols of each subframe constitute a pilot subcarrier group; and send, together with another station according to the resource allocation information, respective uplink data through different code channels in the data subcarrier group in the RU, and send respective pilot symbols through different code channels in the pilot subcarrier group in the RU, wherein the resource allocation information is used to indicate the same RU that is used to transmit the uplink data and the pilots of the station and the other station, and indicate an orthogonal frequency division multiplexing (OFDM) symbol or a code channel that corresponds to the uplink data and the pilots of the station and the other station and that is in a subframe of the same RU.

* * * * *